(12) United States Patent
Muller

(10) Patent No.: US 6,298,360 B1
(45) Date of Patent: Oct. 2, 2001

(54) METHOD AND APPARATUS FOR GENERATING A HIGHLY RANDOM NUMBER WHILE USING EXISTING CIRCUITRY

(75) Inventor: Shimon Muller, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/451,796

(22) Filed: May 26, 1995

(51) Int. Cl.$^7$ .................................................. G06F 7/58
(52) U.S. Cl. ............................. 708/250; 708/256
(58) Field of Search .................. 364/717; 708/250, 708/256

(56) References Cited

U.S. PATENT DOCUMENTS

| | | | |
|---|---|---|---|
| 4,769,777 | * | 9/1988 | Bittle et al. ........................... 364/717 |
| 4,771,429 | * | 9/1988 | Davis et al. .......................... 364/717 |
| 4,852,023 | * | 7/1989 | Lee et al. ............................. 364/717 |
| 5,153,532 | * | 10/1992 | Albers et al. ......................... 364/717 |
| 5,420,928 | * | 5/1995 | Aiello et al. .......................... 364/717 |
| 5,438,622 | * | 8/1995 | Normile et al. ....................... 364/717 |
| 5,515,307 | * | 5/1996 | Aiello et al. .......................... 364/717 |

* cited by examiner

Primary Examiner—Tan V. Mai
(74) Attorney, Agent, or Firm—Kang S. Lim, Esq.

(57) ABSTRACT

A random number generator, useful in association with a computer system of a computer network, generates a randomly distributed back-off time interval between a collision and the retransmission of the packet, e.g. for Ethernet's collision sense multiple access/collision detect (CSMA/CD) protocol. The random number generator includes a data-based number generator, a timer-based number generator and a number combiner. The combiner is provided the output numbers from data-based and timer-based number generators, and in turn generates a random number. A user selectable initialization number is provided as a seed number for the data-based number generator. Subsequently, a cyclic redundancy check (CRC) generator provides numbers for data-based number generator. A free-running timer provides numbers for the timer-based number generator. The user selectable initialization number is also provided as a seed number for the data-based and timer-base generators. Subsequently, the same initialization number or a different number can be loaded into data-base number generator. A feedback path is provided between the output node of the data-based number generator and an adder of the data-based number generator. In this embodiment, the number combiner includes an exclusive "OR" circuit. Advantages of the present invention include a simple digital-only circuit that is easy to fabricate. In addition, the random number generator leverages off existing networking circuitry, e.g., the CRC generator.

8 Claims, 7 Drawing Sheets

METHOD AND APPARATUS FOR GENERATING A HIGHLY RANDOM NUMBER WHILE USING EXISTING CIRCUITRY

BACKGROUND OF THE INVENTION

1. Field of the Invention

The present invention relates to the generation of random numbers. More particularly, the invention relates to random number generation for a computer system on a computer network.

2. Description of the Related Art

A primary function of a computer networking protocol is to provide an efficient and reliable protocol for the transmission of network packets between computer systems on a computer network.

In a networking environment, a collision is an event in which two or more computer systems on the computer network attempt simultaneous packet transmissions. Computer networking protocols can be divided into two general classes with respect to their collision avoidance techniques; collision abstinence protocols and collision reduction protocols. FIG. 1A shows a computer network 100 which includes a plurality of computer systems 111, 112, ... 119 coupled together by a computer networking medium 190.

In collision abstinence protocols, collisions are effectively prevented by a token-passing scheme or equivalent in which only one computer system has possession of a token at an instance in time. The only computer system permitted to transmit on networking medium 190 at that instance is the owner of the token. One example of a token-passing scheme is a token ring network.

In contrast, collision reduction protocols require computer systems to listen on the networking medium 190 while transmitting a packet and to retransmit the packet whenever a collision is detected, e.g. Ethernet's collision sense multiple access/collision detect (CSMA/CD) protocol. Subsequently, in order to reduce the probability of another collision clue to simultaneous packet retransmissions, every computer system involved in the initial collision is responsible for backing off for a randomly distributed time interval before attempting another retransmission. In the case of the CSMA/CD protocol, the scheduling of retransmissions is determined by a process called "Truncated Binary Exponential Backoff" which provides a random integer "r", in a range suitable for the transmission medium, for determining the back-off time interval before the retransmission.

Integer "r" must satisfy two main criteria in order to minimize packet collisions while ensuring fair access to the computer network. First, random integers ("r") generated over a period of time should be uniformly distributed over a predetermined range of integers. Second, apparatus/methods for generating integer "r" should ensure that there is minimal correlation between the random integers generated for any two computer systems on the same network. Typically, a random number generator is used to select a suitable back-off time period for rescheduling the packet retransmission. Conventional random number generators include a free-running digital counter and an analog noise source coupled to an analog-to-digital converter, both of which have inherent disadvantages.

For example, digital counters of computer systems coupled to the computer network have a tendency to synchronize upon a network-wide reset caused by for example a network-wide power failure. Further, these counters will continue to increment at approximately the same rate and cause multiple collisions as the computer systems back off for similar time periods. In the case of partially analog solutions such as noise generators, analog circuitry is combined with digital circuitry. As such, a single integrated chip solution requires relatively complex hybrid semiconductor processes, e.g., BiCMOS process. In addition, analog-to-digital converters, occupy substantial semiconductor real estate.

Hence there is a need for a reliable random number generator that produce uniformly distributed numbers in a truly random manner, and is both inexpensive and easy to implement.

SUMMARY OF THE INVENTION

The present invention provides a random number generator, useful in association with a computer system on a computer network, for generating a randomly distributed back-off time interval between a collision and the retransmission of the packet, e.g. for Ethernet's collision sense multiple access/collision detect (CSMA/CD) protocol. The random number generator includes a data-based number generator, a timer-based number generator and a number combiner. The combiner accepts the output numbers from data-based and timer-based number generators, and in turn generates a random number.

In one embodiment, a user-selectable initialization number is provided as a seed number for the data-based number generator. In this implementation, the initialization number is a unique network address. Subsequently, the same initialization number or a different number can be loaded into data-base number generator. A cyclic redundancy check (CRC) generator provides numbers for data-based number generator on a continuous basis, after initialization has been completed.

A free-running timer provides numbers for the timer-based number generator. The user selectable initialization number is also provided as a seed number for the timer-base generator. Alternatively, a different initialization number can be provided to timer-based number generator. Subsequently, the same initialization number or a different number can be loaded into time-base number generator.

In this implementation, a feedback path is provided between the output node of the data-based number generator and an adder of the data-based number generator. In another implementation, a feedback path is provided between the output node of the random number generator and the adder of the data-based number generator.

In this embodiment, the number combiner includes an exclusive "OR" ("XOR") circuit. However, other suitable logical and/or mathematical functions can be substituted in place of the "XOR" function, e.g., "OR", "NAND", addition, and multiplication.

Advantages of the present invention include a simple digital-only circuit that is easy to fabricate. In addition, the random number generator leverages off existing networking circuitry, e.g., the CRC generator.

Hence, by generating random numbers evenly distributed over a predetermined range, the random number generator of the present invention provides suitable random numbers for determining back-off time intervals between packet retransmissions of a computer system coupled to a computer network.

DESCRIPTION OF THE DRAWINGS

The objects, features and advantages of the system of the present invention will be apparent from the following description in which.

DESCRIPTION OF THE PREFERRED EMBODIMENT

In the following description, numerous details provide a thorough understanding of the invention. These details include functional blocks and exemplary data-based and timer-based number generators to assist a systems designer in implementing an effective random number generator for a networked computer system. While the random number generator is illustrated by an implementation for a specific network protocol, the invention is applicable to a wide variety of applications and environments. In other instances, well-known circuits, structures and program code are not described in detail so as not to obscure the invention unnecessarily.

Figure 1A:
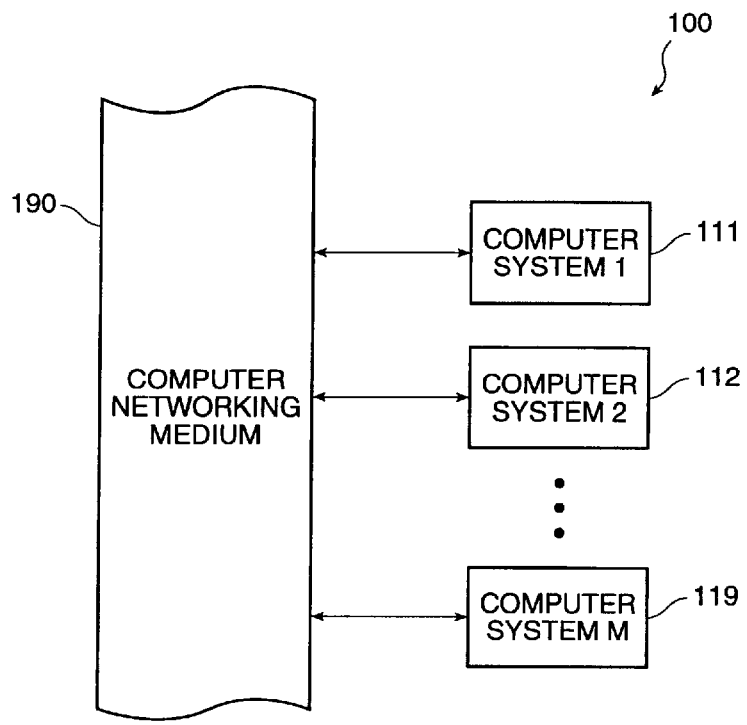
FIG. 1A is a block diagram of a computer network including a plurality of computer systems.
Figure 1B:
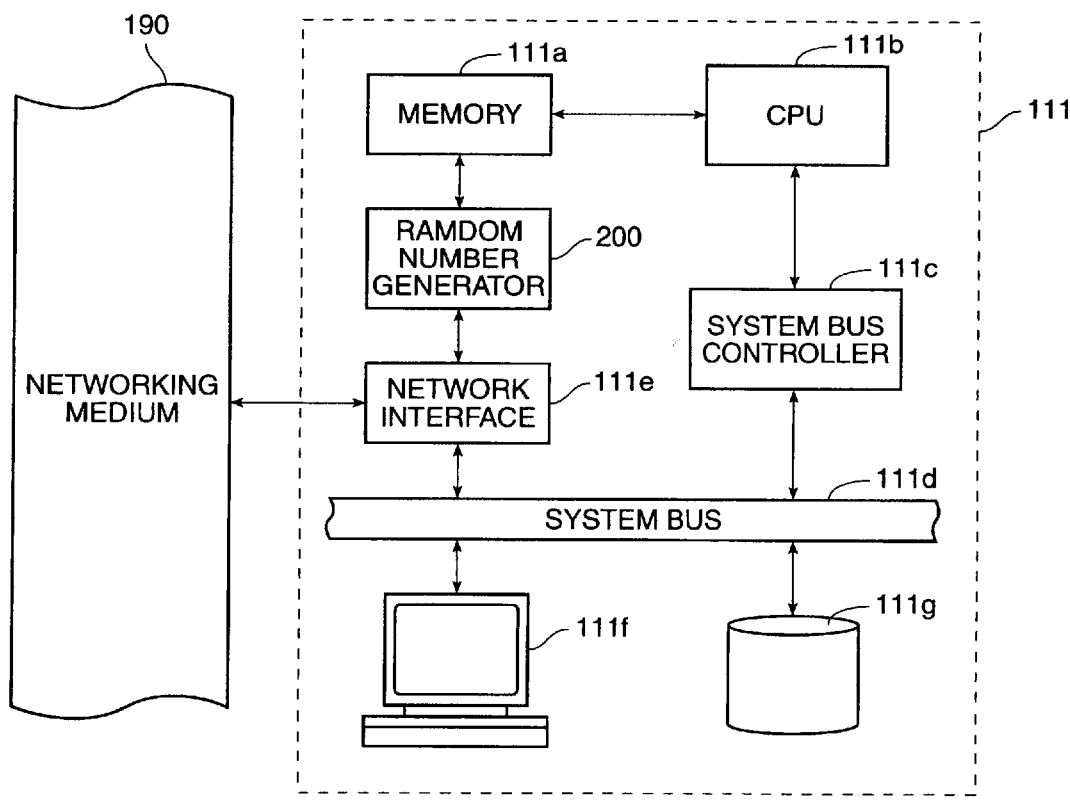
FIG. 1B is a block diagram of one of the computer systems of FIG. 1A.

FIG. 1B is a detailed block diagram showing an examplary one of the plurality of computer systems 111, 112, . . . 119 of FIG. 1A. In this example, computer system 111 includes a memory 111a, a central processing unit (CPU) 111b, a system bus controller 111c, a system bus 111d, a network interface 111e, a monitor/keyboard 111f and a mass storage system 111g. In accordance with the present invention, computer system 111 also includes a random number generator 200 coupled to network interface 111e. Network interface 111e is coupled to CPU 111b via system bus 111d. In addition, network interface 111e is coupled to networking medium 190.

Figure 1C:
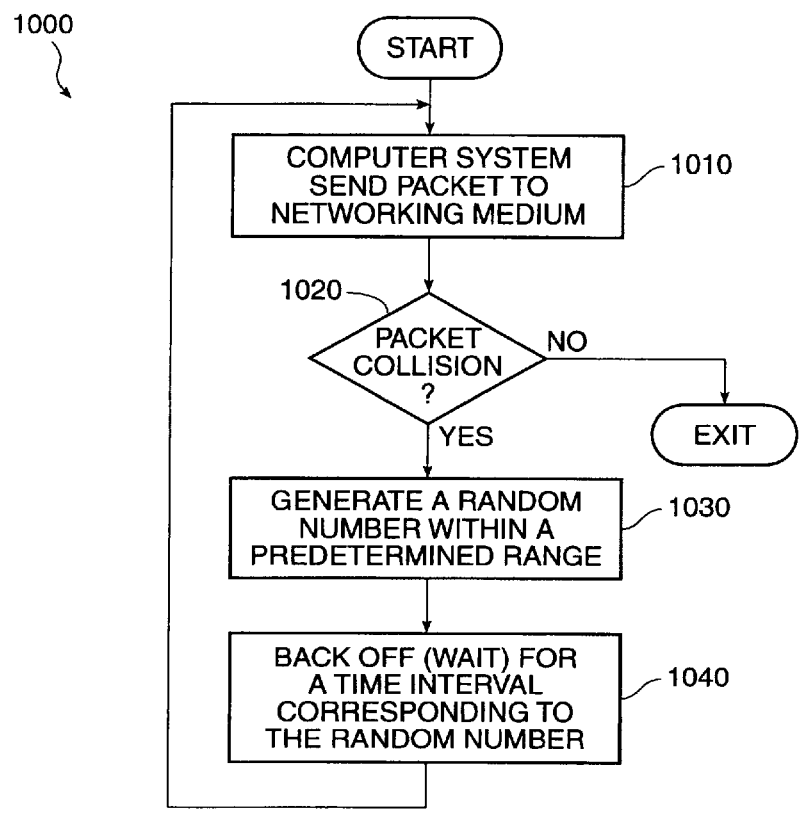
FIG. 1C is a flowchart illustrating the handling of a packet collision and retransmission by a computer system.

Referring now to a flowchart 1000 of FIG. 1C, computer system 111 transmits data packets to networking medium 190 via network interface 111e (step 1010). However, if another computer system, e.g., computer system 112, simultaneously transmit a packet on computer networking medium 190, a collision occurs (step 1020). Such a collision necessitates a retransmission of all the colliding packets by their respective computer systems. Consequently, both computer systems 111 and 112 are responsible for backing off and retransmitting their respective packets at randomly distributed time intervals to avoid further collision(s). Accordingly, computer system 111 then generates a random number within a predefined range (step 1030). Next, computer system 111 backs off (waits) for a random time interval corresponding to the generated random number (step 1040) before attempting to retransmit the same packet on networking medium 190 (step 1010). If there is no collision, the packet transmission is complete. Otherwise, steps 1030, 1040 and 1010 are repeated.

Figure 2A:
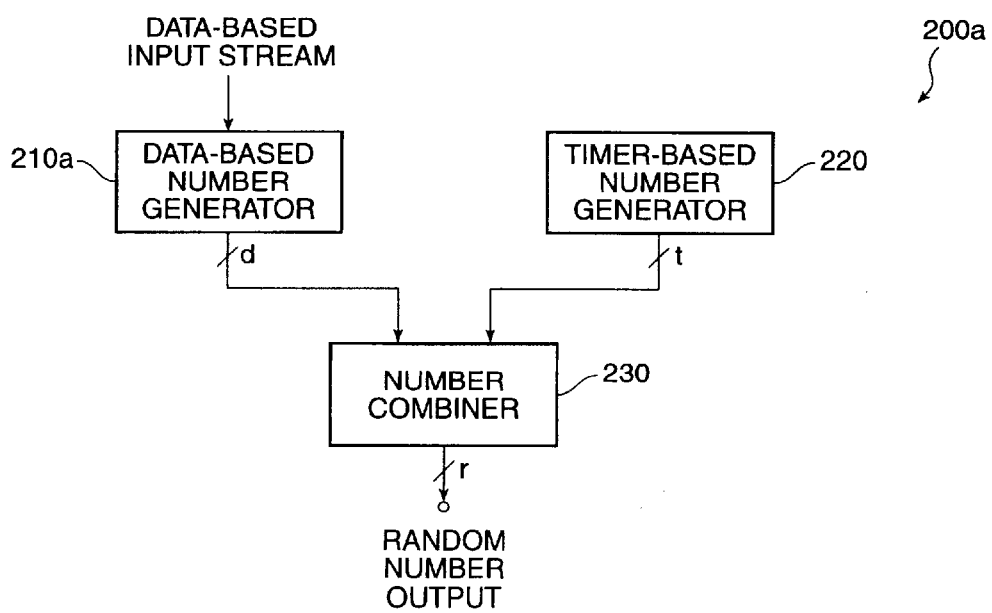
FIGS. 2A and 2B are a block diagram and a flowchart, respectively, illustrating a first embodiment of the random number generator in accordance with the present invention.

In accordance with the invention, as illustrated by the block diagram of FIG. 2A, one embodiment of random number generator 200a for generating the retransmission time interval for computer system 111, includes a data-based number generator 210a, a timer-based number generator 220 and a number combiner 230. A suitable data-based input stream, e.g., outbound data packets, is provided to an input node 210a1 of data-based number generator 210a. In turn, the output nodes of generators 210a, 220 are coupled to the input nodes of number combiner 230.

Figure 2B:
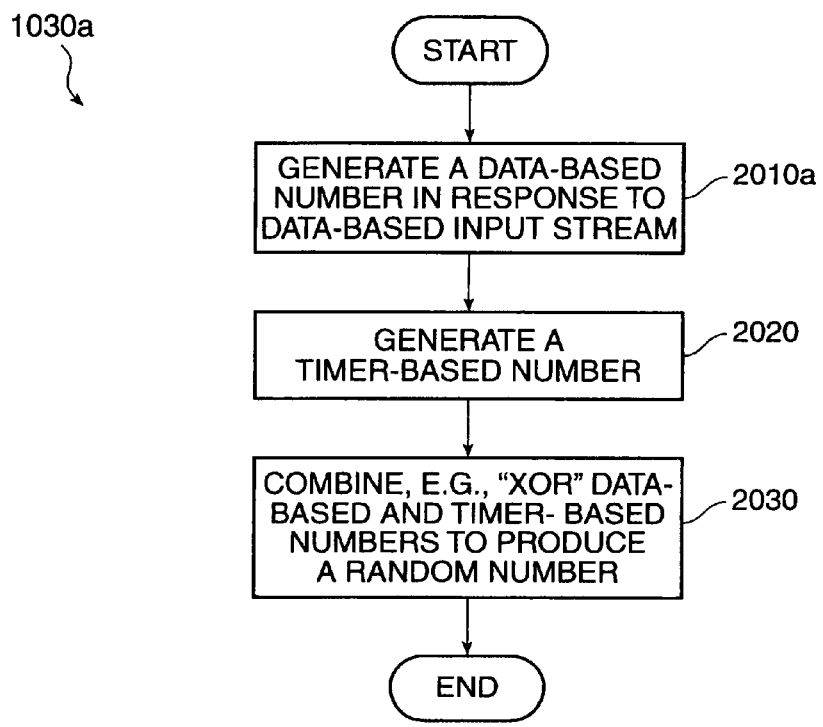

As shown in a flowchart 1030a of FIG. 2B, data-based generator 210a produces a data-based number in response to the data-based input stream (step 2010a), while timer-based number generator produces a timer-based number (step 2120). Combiner 230 performs a bit-by-bit "exclusive-OR" ("XOR") of the data-based and timer-based numbers produced by generators 210a, 220, respectively, to generate a random number for determining the back-off time interval (step 2030). Other suitable logical and/or mathematical functions can be substituted in place of the "XOR" function, e.g., "OR", "NAND", addition, and multiplication.

In this embodiment, word sizes "d", "t", "r" are the same size (10 bits wide) and all "r" bits are used to determine suitable back off intervals for computer system 111. In other implementations, words sizes "d", "t", "r" may be different and/or a subset of the "r" bits may be used. For example, random number generator 200a may provide subsets of the "r" bits for multiple network interfaces (not shown) of computer system 111 or for any other circuit(s) (not shown) of computer system 111 requiring random numbers.

Figure 2C:
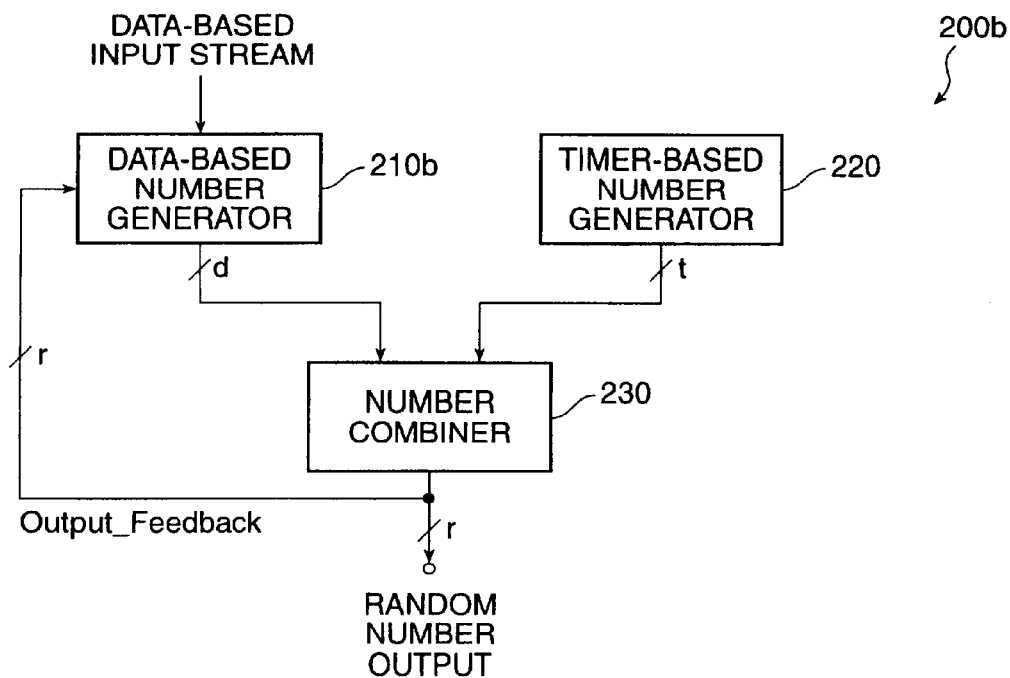
FIGS. 2C and 2D are a block diagram and a flowchart, respectively, illustrating a second embodiment of the random number generator in accordance with the present invention.

FIG. 2C shows another embodiment of random number generator 200b which includes a data-based number generator 210b, a timer-based number generator 220 and a number combiner 230. The structure of data-based generator 210b is similar to that of data-based generator 210a, except a feedback path, external with respect to data-based generator 210b, is provided between the output node of combiner 230 and an input node of data-based number generator 210b.

Figure 2D:
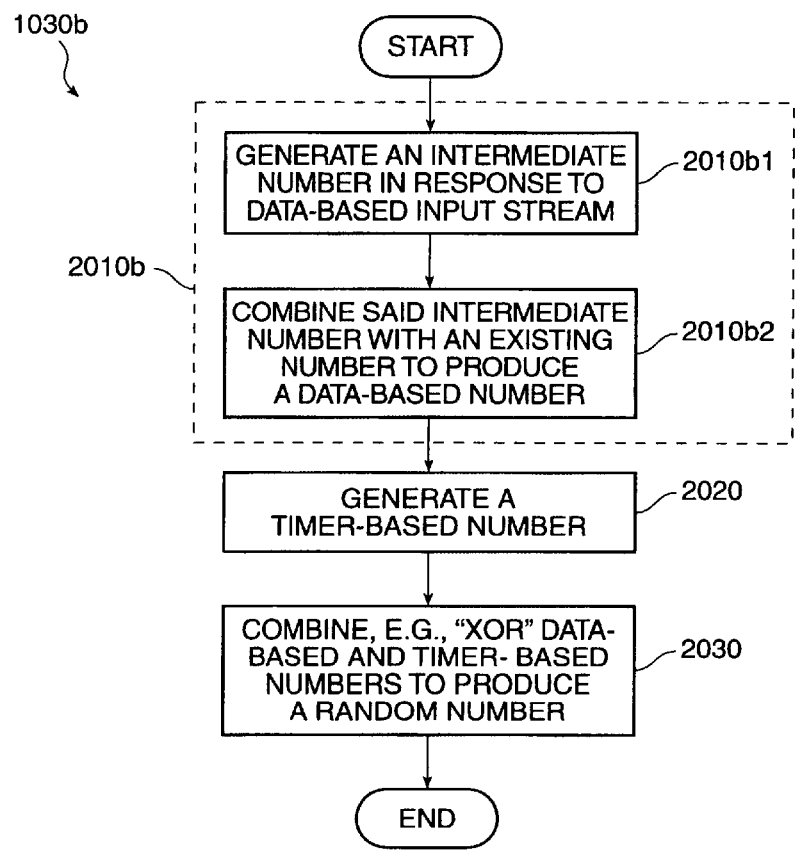

Referring now to the flowchart 1030b of FIG. 2D, data-based generator 210b produces a data-based number in response to the data-based input stream (step 2010b). First, an intermediate number is generated in response to the data-based input stream (step 2010b1). When previously generated (existing) random numbers from combiner 230 are available, they are fed back into data-based number generator 210b and combined with the intermediate number in order to increase the randomness of the distribution of data-based numbers produced by data-based number generator 210b (step 2010b2). In this embodiment, the entire r-bit wide (existing) random number is fed back into data-based generator 210b. In other embodiments, a portion of the previously generated random number is fed back into data-based number generator 210b.

Meanwhile, timer-based number generator produces a timer-based number (step 2120). Combiner 230 then performs a bit-by-bit "XOR" of the data-based and timer-based numbers produced by generators 210a, 220, respectively, to generate a random number for determining the back-off time interval (step 2030).

Figure 3A:
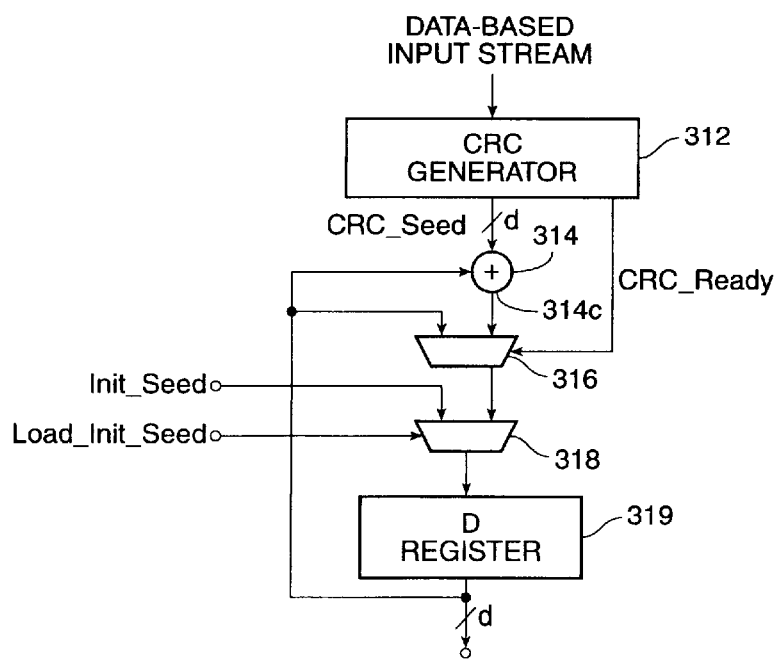
FIGS. 3A and 3C show two detailed implementations of data-based number generators corresponding to the two random number generators of FIGS. 2A and 2C.

Referring now to the block diagram of FIG. 3A, data-based number generator 210a is shown in detail and includes a cyclic redundancy check (CRC) generator 312, an adder 314, a first multiplexor (MUX) 316, a second MUX 318 and a D register 319. In some embodiments, adder 314 is replaced by other arithmetic or logic functions.

The CRC_Seed output node of CRC generator 312 is coupled to a first input node of adder 314. The output node of adder 314 is coupled to an input node of MUX 316. In turn, the output node of MUX 316 is coupled to an input node of MUX 318. An external value Init_Seed is provided to another input node of MUX 318 whose output node is coupled to the input node of D register 319. A feedback path couples the output node of D register 319 to the respective input nodes of adder 314 and MUX 316.

Figure 3B:
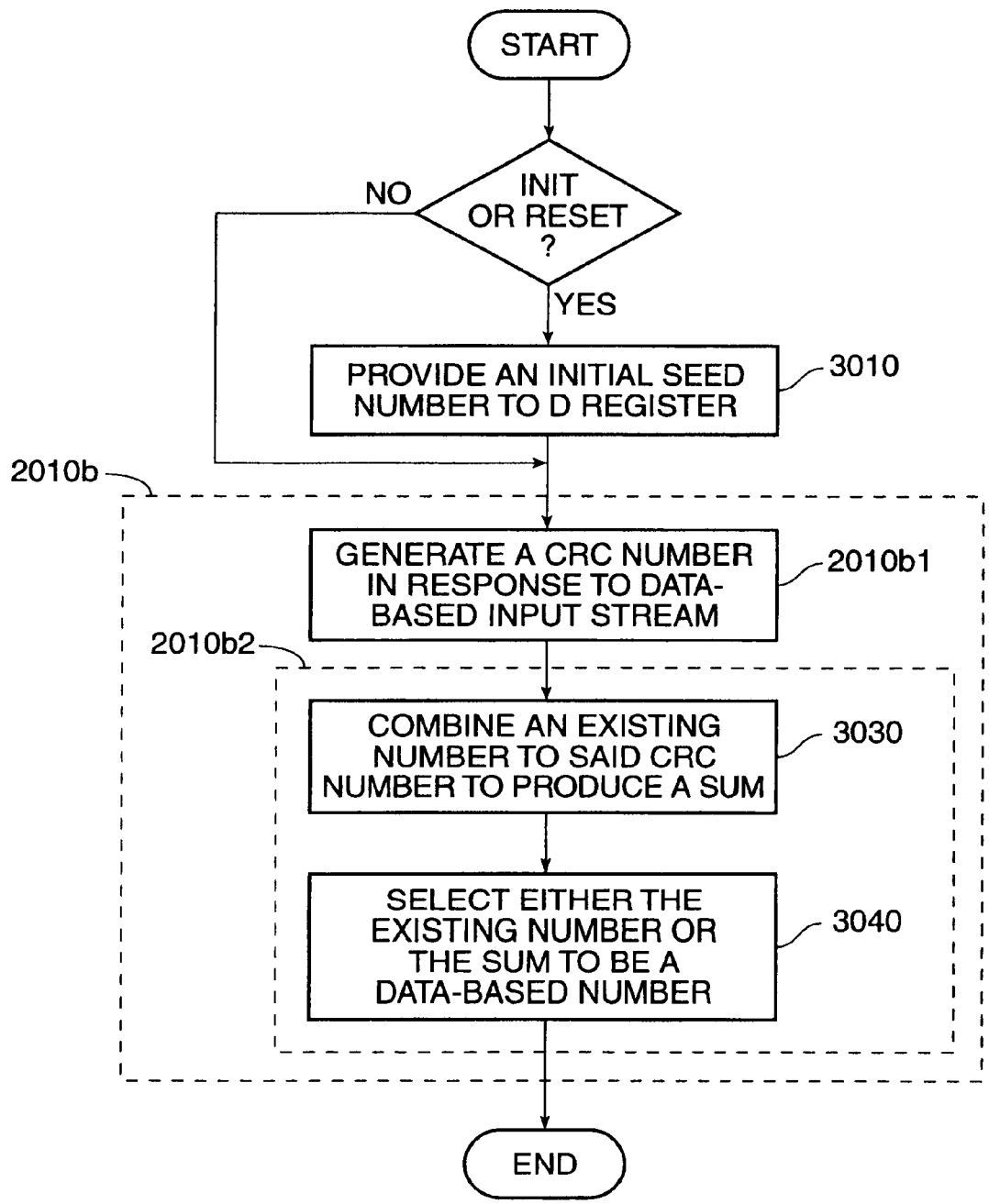
FIG. 3B is a flowchart illustrating the implementations of FIGS. 3A and 3C.

Operation of data-based number generator 210a is as shown in the flowchart of FIG. 3B. First, a user selectable Init_Seed value is provided to a first input node MUX 318 for initializing D register 319 when computer system 111 is first powered up or reset (step 3010). A Load_Init_Seed signal controls the loading of MUX 319. Initialization of generator 200a with a unique number is important because upon a power-up or reset of computer network 100, registers of the affected computer systems, e.g., the respective D registers 319 of computer systems 111, 112, . . . 119, have a tendency to stabilize at a similar logic state. In this implementation, the network node address of computer system 111 is used to generate a suitable unique Init_Seed value. Other suitable sources of initialization numbers are also possible. For example, the user-selectable Init_Seed value can be derived from an alternate source such as the unique serial number of computer system 111.

After initialization, in response to a a data-based input stream, e.g., a data packet from CPU 111b, CRC generator 312 provides a CRC_Seed number to adder 314 (step 2010b1). In this implementation, an existing value is also fed back to adder 314 from output node 319c of D register 319. The sum generated by adder 312 at the output node 314c is then provided to MUX 316 (step 3030). The feedback value from output node 319c of D register 319 is also provided to MUX 316. CRC generator 312 provides a control signal CRC_Ready for selecting/loading MUX 316.

Normally, the output of adder 314, i.e., the sum from adder 314, is loaded into MUX 316. However when no new data packet(s) are available to CRC generator 312 or when the content of the data-based input stream is repetitive, then instead of using the sum from adder 314, the feedback value (alone) from D register 319 is selected as the alternate input source for MUX 316 (step 3040).

In either case, feeding back a previously-generated data-based value from the output node 319c of D register 319 alone or in combination with the CRC_Seed value advantageously increases the probability of randomness of data-based numbers generated by data-based number generator 210a. This is because although data bit patterns are generally random over a substantial period of time, within a shorter time period, bit patterns can be repeated or be similar enough to cause CRC generator 312 to produce identical CRC numbers.

Next, the output number from MUX 316 is provided to a second input node of MUX 318. As described above in step 3010, a user-selectable Init_Seed value is provided to the first input node MUX 318 during the initialization of D register 319 when computer system 111 is first powered up or reset. Thereafter, the output value from MUX 316 is selected by MUX 318. D register 319 can also be reloaded at any time after initialization with the same Init_Seed value or any other suitable value selected by the user. Hence, D register 319 serves as a buffer for storing the data-based number produced by generator 210a at the output of MUX 318.

Note that in a typical Ethernet implementation, CRC generator 312 is an existing component of the networking circuitry and hence does not involve additional cost. Further, CRC generator 312 is required to generate a CRC number whenever computer system 111 transmits a packet over networking medium 190, regardless of whether random number generator 200a needs a CRC number or not. As such the generation of a CRC number does not cause additional time delays. In this embodiment, word size "d" is equal to ten bits; for instance with the least significant ten bits of a typical 32-bit CRC number from CRC generator 312 provided as input to adder 314.

Figure 3C:
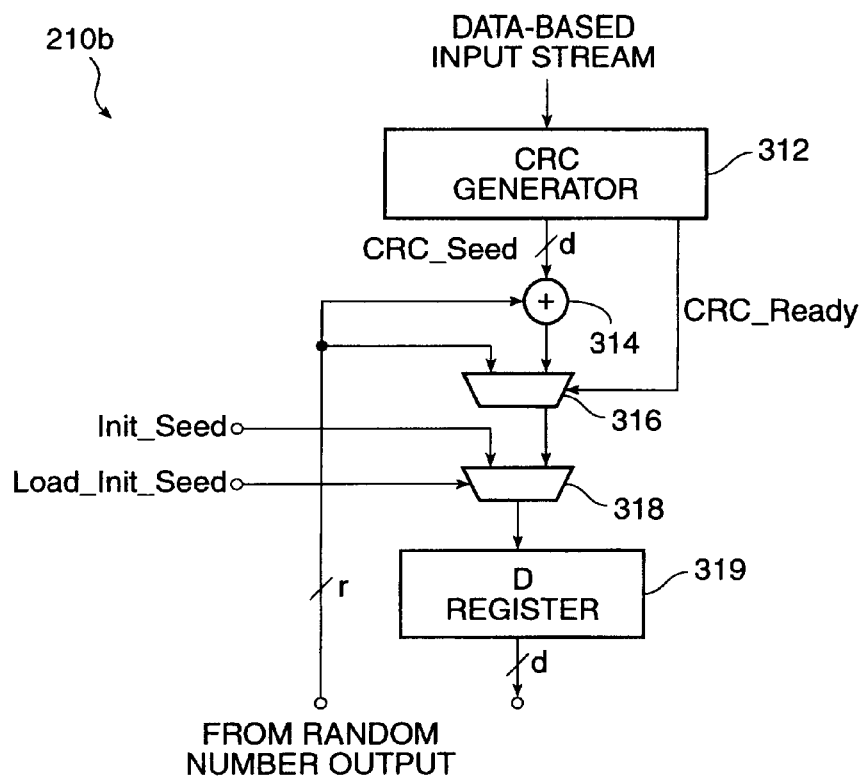

Modifications of random number generator 200 are possible. For example, as shown in the block diagram of FIG. 3C, in another embodiment of generator 200b, a data-based number generator 210b is fed back a previously generated number by combiner 230 instead of the data-based number previously generated by data-based number generator 210b, thereby further increasing the probability of randomness of the numbers generated by data-based number generator 210b for the same reasons discussed above.

Figure 4A:
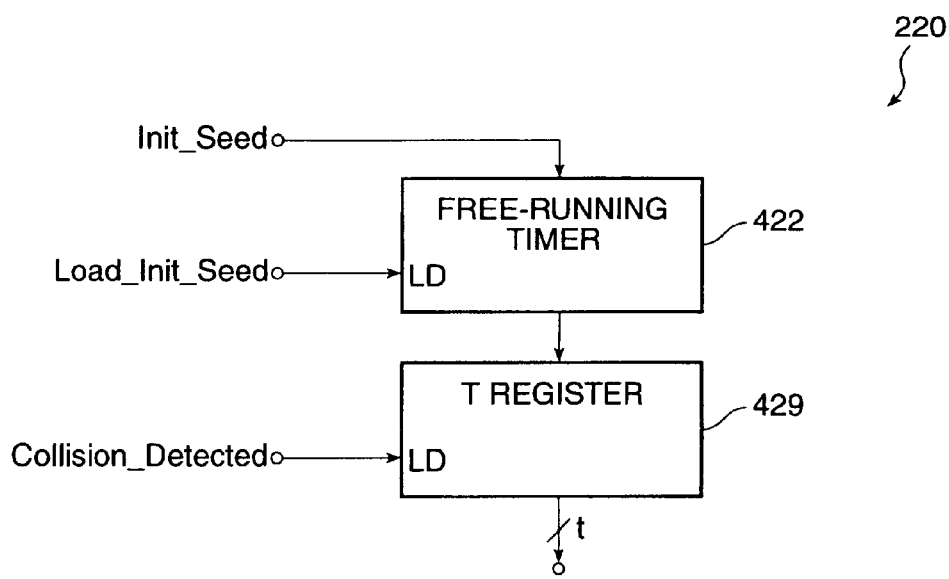
FIGS. 4A and 4B are a block diagram and a flowchart, respectively, illustrating a timer-based number generator for both embodiments of FIGS. 2A and 2B.
Figure 4B:
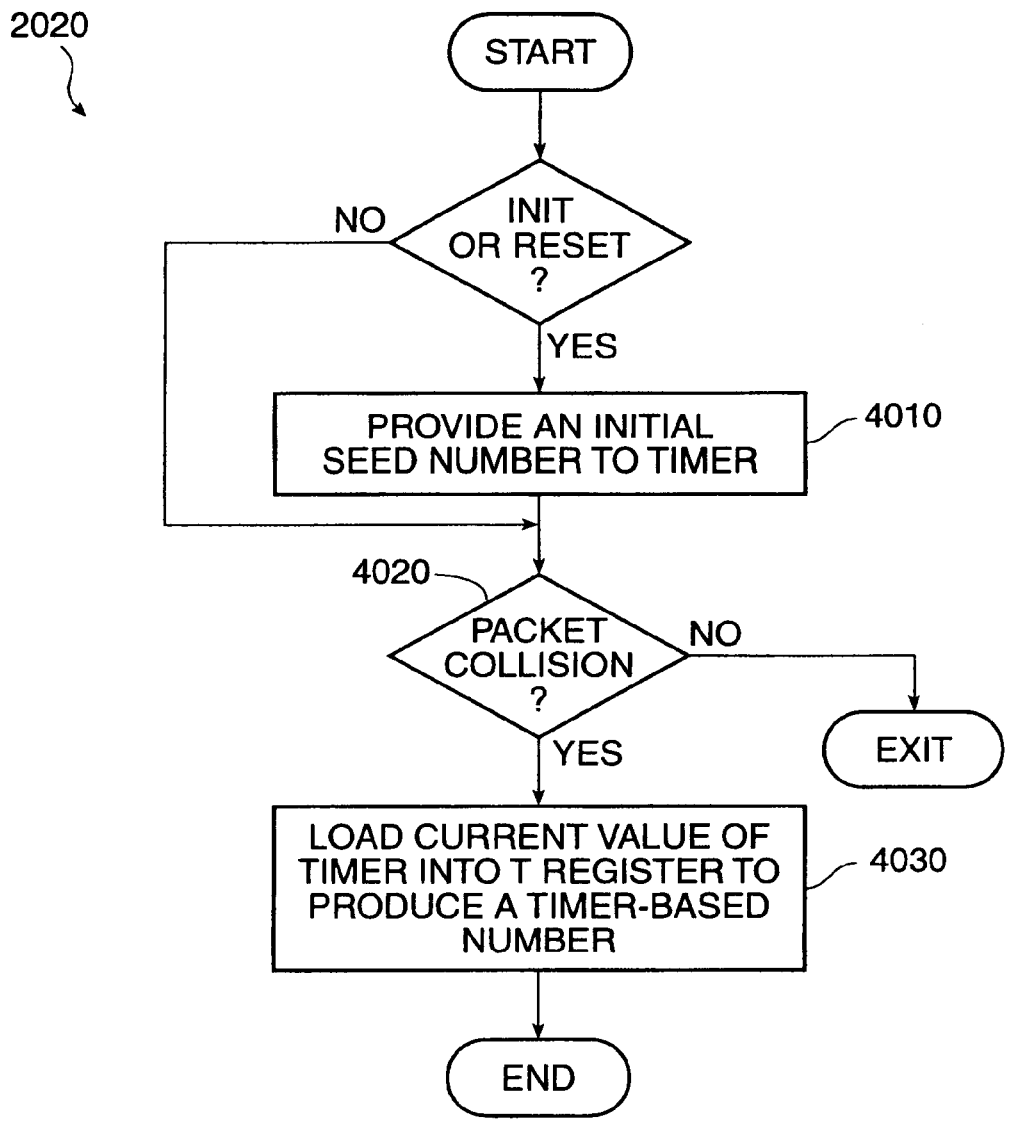

FIG. 4A and 4B are a detailed block diagram and a flowchart, respectively, illustrating timer-based number generator 220. Generator 220 includes a free-running timer 422 and a T register 429. The output node of timer 422 is coupled to the input node of T register 429. Alternatively, instead of free-running timer 422 which is internal with respect to generator 220, generator 220 may be coupled to an external free-running timer/counter (not shown) of computer system 111.

Operation of timer-based number generator 220 is as follows. First, a user-selectable initialization value is used to initialize timer 422 when computer system 111 is first powered up or reset (step 4010). Line Load_Init_Seed controls the initialization of timer 422. In this embodiment, the Init_Seed value provided to D register 319 is also provided to free-running timer 422. Other suitable initialization values can also be used for initializing timer 422, i.e., different initialization numbers can also be provided to the respective data-based and timer-based generators 210, 220. Thereafter, should the need arise, timer 422 can be reloaded with Init_Seed value or other user-selectable value. After initialization, when a packet collision is detected (step 4020), a control signal Collision_Detected loads T register 429 with the current value of free-running timer 422 (step 4030).

Trade-offs are possible in implementing random number generators 200a, 200b. For example the respective feedback paths of data-based number generators 210a, 210b can be eliminated, trading off randomness for reduced circuit complexity. In addition, although random number generators 200a, 200b are illustrated using hardware implementations, generators 200a, 200b can be implemented in software or a combination of both hardware and software.

Other modifications and additions are also possible without departing from the spirit of the invention. For example, CRC generator can be replaced by another suitable data-based seed values such as error correcting code (ECC) generators such as a Manchester encoder. In addition, word sizes "d", "t" and "r" can be different for other networking protocols. Hence, the scope of the invention should be determined by the following claims.

What is claimed is:

1. A method of generating random numbers for a computer system of a computer network, the method comprising the steps of:

providing a cyclic redundancy check (CRC) number to a data-based random number generator of said computer system;

providing an existing number to said data-based random number generator;

generating a data-based random number from said CRC number and said existing number using said data-based random number generator;

generating a timer-based random number using a free running timer of said computer system; and combining said data-based and timer-based random numbers to produce a third random number.

2. The method of claim 1 wherein said existing number is a unique network identification number.

3. The method of claim 1 wherein said existing number is a previously generated data-based number.

4. The method of claim 1 wherein said existing number is a previously generated random number.

5. A random number generator useful in association with a CSMA/CD computer network, said generator comprising:

a data-based random number generator configured to generate a data-based random number from a cycle redundancy check (CRC) number and an existing number;

a timer-based random number generator including a free-running timer configured to generate a timer-based random number; and a combiner coupled to said data-based and time-based random number generators and configured to combine said data-based and timer-based random numbers to produce a third random number.

6. The random number generator of claim 5 wherein said existing number is a unique network identification number.

7. The random number generator of claim 5 wherein said existing number is a previously generated data-based number.

8. The random number generator of claim 5 wherein said existing number is a previously generated random number.

* * * * *